United States Patent

Janu et al.

[11] Patent Number: 5,292,280
[45] Date of Patent: Mar. 8, 1994

[54] METHOD AND APPARATUS FOR CONTROLLING VENTILATION RATES AND INDOOR AIR QUALITY IN AN HVAC SYSTEM

[75] Inventors: George J. Janu, Brookfield; Mark W. Tellier, Brown Deer, both of Wis.; Kirk H. Drees, West Lafayette, Ind.

[73] Assignee: Johnson Service Co., Milwaukee, Wis.

[21] Appl. No.: 963,319

[22] Filed: Oct. 15, 1992

Related U.S. Application Data

[63] Continuation-in-part of Ser. No. 835,667, Feb. 14, 1992.

[51] Int. Cl.$^5$ .............................................. F24F 11/00
[52] U.S. Cl. ............................... 454/229; 454/370; 73/861.04
[58] Field of Search ................ 454/228, 229, 239, 370; 73/1 G, 31.01, 31.02, 23.2, 861.04

[56] References Cited

U.S. PATENT DOCUMENTS

| | | |
|---|---|---|
| 3,369,405 | 2/1968 | Galegar . |
| 4,051,731 | 10/1977 | Bohl et al. ........................ 73/422 R |
| 4,090,392 | 5/1978 | Smith et al. ...................... 73/421.5 R |
| 4,164,172 | 8/1979 | Anderten et al. .................... 454/229 |

FOREIGN PATENT DOCUMENTS

| | | |
|---|---|---|
| 174231 | 6/1992 | Japan ................................ 454/229 |
| 174233 | 6/1992 | Japan ................................ 454/229 |

OTHER PUBLICATIONS

American Society of Heating, Refrigerating and Air-Conditioning Engineers, Inc. (ASHRAE).
ASHRAE Standard 62-1989 entitled "Ventilation for Acceptable Indoor Air Quality".

*Primary Examiner*—Harold Joyce
*Attorney, Agent, or Firm*—Streich Lang

[57] ABSTRACT

An apparatus and method indirectly determines the amount of outside air introduced into the ventilation system of a structure to control the indoor air quality in the structure. Test gas concentrations, preferably carbon dioxide concentrations, are measured for return air, outside air and mixed (supply) air. The flow rate of mixed air is measured. The volume of outside air introduced into the system is determined through use of the test gas concentration measurements without directly measuring the volume or flow rate of outside air. Preferably, a single sensor is utilized to measure each of the trace gas concentrations in the return air, outside air and supply air, and the various measurements sequentially multiplexed to a controller. Moreover, for calibrating the apparatus, a return air sensor is calibrated to the outside air and a mixed air sensor is calibrated to the outside air or the return air to eliminate inaccuracy due to sensor drift.

7 Claims, 6 Drawing Sheets

METHOD AND APPARATUS FOR CONTROLLING VENTILATION RATES AND INDOOR AIR QUALITY IN AN HVAC SYSTEM

REFERENCE TO RELATED APPLICATION

This application is a Continuation-In-Part Application of U.S.S.N. 835,667, filed Feb. 14, 1992, and entitled "Method and Apparatus for Ventilation Measurement Via Carbon Dioxide Concentration Balance" by Kirk Drees.

BACKGROUND OF THE INVENTION

The present invention is generally directed to a method and apparatus for controlling ventilation rates and indoor air quality in a Heating, Ventilation and Air Conditioning (HVAC) system; more particularly, the present invention is directed to a method and apparatus for controlling outdoor air flow volume in an HVAC system using trace gas concentration sensing.

Indoor air quality is, without question, a topic of necessary importance. Not only are occupants of buildings, e.g., office spaces and the like, increasingly concerned about and aware of health issues, but technical associations have recently issued standards which specify minimum ventilation rates for acceptable indoor air quality. For example, the American Society of Heating, Refrigerating and Air-Conditioning Engineers, Inc. (ASHRAE) has issued ASHRAE Standard 62-1989 entitled "Ventilation for Acceptable Indoor Air Quality." ASHRAE standards are generally established to assist industry and the public by suggesting safe practices, and conformance with them is completely voluntary. Nevertheless, such standards are developed under the auspices of ASHRAE and reflect a consensus reached by concerned interests with respect to the topics contained in the standards. Moreover, many ASHRAE standards, such as ASHRAE Standard 62-1989, are rapidly becoming incorporated into local building codes.

ASHRAE 62-1989 specifies alternative procedures for ensuring acceptable air quality indoors: a ventilation rate procedure and an indoor air quality procedure. Acceptable air quality is achieved in accordance with the ventilation rate procedure by providing ventilation air of a specified quality and quantity to a given space. Similarly, acceptable air quality is achieved within the space in accordance with the indoor air quality procedure by controlling known specifiable contaminants.

In greater detail, ASHRAE 62-1989 prescribes supply rates of acceptable outdoor air required for acceptable indoor air quality for residential, institutional and commercial facilities. As set forth in the Standard, the supply rates incorporate an adequate margin of safety and to account for health variations among people. These rates are a function of, inter alia, the type of environment (i.e., smoking lounge, office space) and the number of occupants. The ASHRAE outdoor air requirements for ventilation range from about 15 (for example, in office reception areas) to about 60 cubic feet per minute (CFM) per person (in, for example, smoking lounges) as being the minimum prescribed supply rate of acceptable outdoor air required.

Indoor air quality is also a function of many variables, including, inter alia, the quality of outdoor air, the configuration of enclosed spaces, the design and maintenance of the ventilation system, as well as the presence and strength of contaminant sources. A properly designed ventilation system must take all of these variables into account to maintain an acceptable level of indoor air quality.

There are many sources of space contaminants. Humans and their activities release a wide assortment of organic and inorganic chemicals. Personal care products, photocopy machines and other office equipment release chemicals. Growth of fungal material can release spores into the air. Standing water can allow harmful bacteria to multiply. Office furniture, partitions, paint, floor coverings and cleaning materials release chemicals into the air. Cracks in below-grade walls and floors can allow radon gas to enter the building.

The outdoor air itself can be a source of unwanted contaminants. This is particularly true for buildings located in large, congested metropolitan areas, or in cases where the outdoor air intake location is near loading docks, garages or near the building exhaust.

Most air source contaminants can be classified as one of the following: particulate matter, inorganic compounds, volatile organic compounds or microbes and their by-products. Particulate matter includes, inter alia, tobacco smoke, dust, and the like. Inorganic air contaminants include gases such as carbon dioxide, carbon monoxide, nitrogen dioxide, ozone or radon as well as particulates like asbestos or fiberglass. Volatile organic compounds include those generated by, for example, cleaning materials, personal care products, furniture, carpet, adhesives, paint and people.

As noted above, one acceptable mode of compliance with ventilation rate requirements is by measuring and controlling deleterious substances below safe levels (such as is provided with ASHRAE Indoor Air Quality Procedure). This strategy is, however, inherently very rigorous because it considers all contaminants and implementation is difficult because insufficient knowledge exists respecting safe concentration levels for the thousands of combinations of potential indoor contaminants. In addition, it is currently not cost effective to purchase sensors to monitor all of these contaminants.

Another acceptable mode of complying with ventilation requirements is to provide continuous measurement of the ventilation air flow rate so that it can be regulated to a specified rate. One known practice is to set a fixed minimum position for the outdoor intake air damper which is expected to ensure adequate flow regulation in all modes of operation. However, observed results are only marginally acceptable in some cases, such as in a constant volume fan system, and are unacceptable in most variable air volume systems.

Thus, to ensure that a specified amount of ventilation air is supplied to a space, measurement and closed loop control of the ventilation air flow rate is highly desirable. However, measurement of the ventilation air flow rate can be very difficult and expensive to implement accurately.

For example, the ventilation (i.e., outdoor) air flow rate can be measured through use of an air flow meter. The most common technique used to measure air flow is the pitot tube air flow station. Such stations generally incorporate a fixed array of pitot tubes. The pitot tubes in these stations sense the velocity pressure of the air as it passes around the tube; the corresponding air velocity is related to the velocity pressure in a known manner. For measuring outdoor air flow, these flow stations would typically be installed near the outdoor air intake where the maximum air velocity is generally less than 500 ft/min. Since the velocity pressure associated with 500 ft/min is only 0.016 in. w.c. (4 Pa), a very small error in the output of the differential pressure transmitter used to evaluate the pitot tube signal can cause a very large error in the calculated air velocity. For this reason, pitot tube stations are generally not viable for air velocities below 800 ft/min (4.1 m/s) unless exceptionally accurate differential pressure transmitters with auto-zeroing capabilities are installed. Unfortunately the high cost associated with this type of transmitter may be prohibitive in many installations. Thus, pitot tube air flow stations are unable to provide the required sensing accuracy when installed in a typical outdoor air intake configuration.

A less common type of air flow station utilizes an array of thermally sensitive resistors (heated thermistors) to measure air flow. If voltage is applied across a thermistor, the relationship between the air velocity, air temperature and the power dissipation can be determined. Such quantities are generally determined through the use of microprocessors. These stations are capable of accurately measuring air velocity below 500 ft/min. However, because of the high sensitivity of these devices at low air flow rates, low levels of turbulence can adversely affect the accuracy of the air flow measurement. Unfortunately, outdoor air intakes are typically very turbulent environments. Moreover, complicated field calibration procedures must be employed and it is often difficult to accurately compensate for the effect of changing air temperature. Thus, thermal air flow stations are not a very good solution to the problem of directly measuring the outdoor air flow rate accurately.

Alternatively, if the outdoor and return air streams are adiabatically mixed, conservation of mass and energy laws can be utilized to calculate ventilation air flow rate on the basis of measured temperatures of the outside air, the return air and the mixed air. For example, outdoor air flow rate ($CFM_{oa}$) can be determined based on the temperature of the outdoor air ($T_{oa}$), temperature of return air ($T_{ra}$), temperature of mixed air ($T_{ma}$), as well as the mixed air flow rate ($CFM_{ma}$) in accordance with the following relationship:

$$CFM_{oa} = \left( \frac{T_{ra} - T_{ma}}{T_{ra} - T_{oa}} \right) \cdot CFM_{sa}$$

A typical fan system layout, as shown in FIG. 1, can be used to implement the foregoing equation. Transmitters or sensors for measuring $T_{ra}$, $T_{ma}$, $T_{oa}$ and $CMF_{ma}$ are advantageously positioned as shown in FIG. 1. However, when the difference between $T_{ra}$ and $T_{oa}$ becomes small, even small errors in the measurement of either $T_{ra}$ or $T_{oa}$ can cause very large errors in the calculated outdoor air flow rate. Inasmuch as temperature sensing errors of ± 1 degree Fahrenheit are the industry norm, unacceptable measurements result when the difference between the return and outdoor air temperatures is less than 10 degrees Fahrenheit. Most environments have significant time periods when the difference between the outdoor and return air temperatures is less than 10 degrees. Thus, a temperature based thermal energy balance is only a marginally acceptable strategy for calculating outdoor air flow rates.

Multi-point sampling probes are also known. For example, U.S. Pat. No. 3,369,405 issued Feb. 20, 1968 to Galegar discloses a sampling system for simultaneous sampling from multiple points. The samples are stored in separate containers, and then sequentially passed to the analyzer for analysis. Further, U.S. Pat. No. 4,090,392 issued May 23, 1978 to Smith et al. discloses an automatic gas analyzer system which provides for sequential analysis of a number of samples. A number of sample tubes and vent lines are utilized to ostensibly assure a fresh sample at a point near the sample analyzer in the form of an atomic absorption spectrophotometer. A multiplexer in the form of a three-way control valve is utilized to sequentially pass the samples to the analyzer. Also disclosed is the use of sample inputs for auto-zero and auto-span adjustment of the analyzer. An analogous system for gas sampling in large ducts and pipes is shown in U.S. Pat. No. 4,051,731 issued Oct. 4, 1977 to Bohl et al.

None of these systems, however, provide an accurate, indirect method and apparatus for measuring the flow rate of outdoor, ventilation air, such as is necessary, for example, to ensure compliance with indoor air quality standards. Thus, there exists a long-felt and heretofore unresolved need of providing an accurate and reliable method and apparatus for controlling ventilation rates and indoor air quality.

SUMMARY OF THE INVENTION

The present invention provides an accurate, indirect method and apparatus for measuring the flow rate of outdoor, ventilation air which overcomes the limitations and disadvantages of the foregoing techniques. The present invention finds particular application in a ventilation system for a structure which includes a supply duct for supplying mixed air to the structure, a return duct for extracting return air from the system, a recirculation duct for recirculating return air to the supply duct, and intake and exhaust ducts for admitting or venting air between the external environment and the ventilation system.

The manner in which the present invention accomplishes this will be described in detail in connection with the description of the preferred embodiments. However, in general, the method and apparatus of the present invention indirectly determine the flow rate of outside (or makeup) air from the ratio of the difference between the concentration or a tracer gas in the return air and the concentration in the supply air to the difference between the concentration of tracer gas in the return air and the concentration in the outside air. To ensure accurate and consistent measurement, an automatic calibration method and apparatus is also disclosed.

Moreover, a method and apparatus is presented for enhancing the accuracy of the calculation of outside air flow rate which utilize a single sensor suitably configured to sequentially sense the various tracer gas concentration levels. In such manner, sensing errors inherent in conventional sensors are minimized or eliminated.

In accordance with a preferred embodiment of the invention, methods and apparatus are provided for determining the flow rate of makeup fluid being utilized to circulate a mixed fluid of the makeup fluid and a return fluid within a volume. The apparatus includes at least one sensor for sensing a component of the makeup fluid and for providing a first output indicative of the makeup fluid component, for sensing the same component of the return fluid and for providing a second output indicative of the return fluid component, and for sensing the same component of the supply fluid and for providing a third output indicative of the supply fluid component. The apparatus also includes a circulation device for introducing the supply fluid into the volume. The flow rate of the makeup fluid can thus be determined from the ratio of the difference between the second output and the third output to the difference between the second output and the first output.

The invention also provides a method for determining the flow rate of outside air introduced into a system for circulating in a structure mixed air comprising outside air and return air. The method includes the steps of circulating supply air in the structure, removing return air from the structure and recirculating at least a portion of return air back into the system. The concentration of a component in return air is measured and a return air component concentration produced, the concentration of the same component in outside air is measured and an outside air component concentration is produced, and the concentration of the-same component in supply air is measured and a supply air component concentration is produced. The flow rate of outside air is then determined from the ratio of the difference between the return air component concentration and the supply air component concentration to the difference between the return air component concentration and the outside air component concentration.

The invention still further provides a method for use of an apparatus for controlling the amount of outside air introduced into a system for circulating supply air in a structure, the apparatus being of the type including intake control means, recirculation control means, outside air sensor means, return air sensor means and supply air sensor means. The method calibrates the supply air sensor means and the return air sensor means and includes the steps of opening the intake control means, closing the recirculation control means, calibrating the supply air sensor means to the outside air sensor means, closing the intake control means, opening the recirculation control means, and calibrating the return air sensor means to the supply air sensor means.

A control system to calibrate the multiple sensors used in accordance with one aspect of the invention is also provided.

BRIEF DESCRIPTION OF THE DRAWINGS

A preferred exemplary embodiment of the present invention will be hereinafter described in conjunction with the appended drawing figures, wherein like numerals denote like elements, and.

DETAILED DESCRIPTION OF PREFERRED EXEMPLARY EMBODIMENTS

Figure 1:
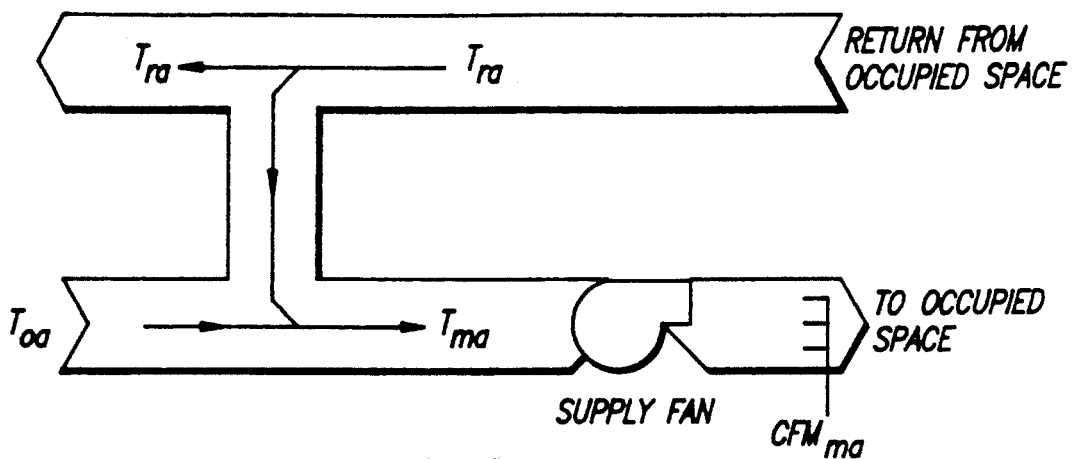
FIG. 1 shows a typical air circulation system layout illustrating one aspect of the prior art.
Figure 2:
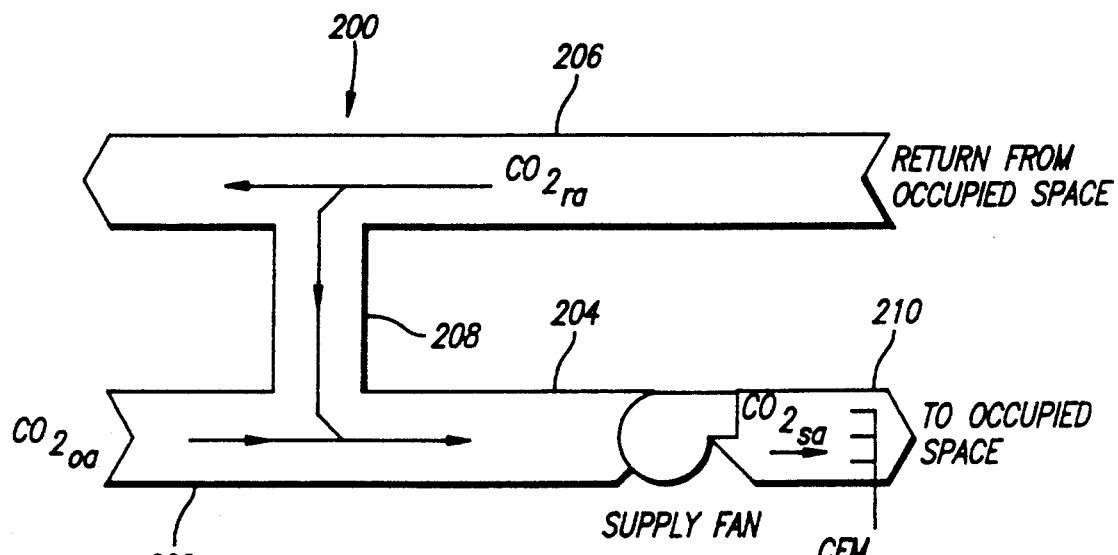
FIG. 2 shows an air circulation system layout in accordance with the present invention.
Figure 3:
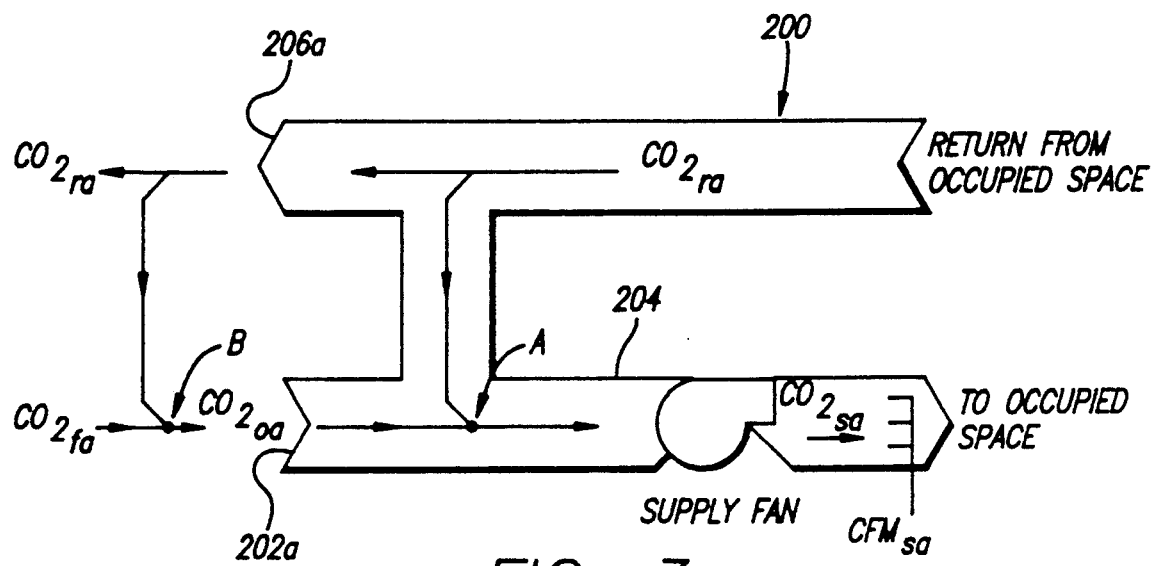
FIG. 3 shows an air circulation system layout illustrating air short cycling from the building exhaust to the building outdoor air intake.

Referring now to FIGS. 2 and 3, an exemplary heating, ventilation and air conditioning (HVAC) airflow circuit 200 suitably comprises an outside air duct 202, a supply air duct 204, a return air duct 206, and a recirculation duct 208. During normal operation, outside air is drawn in through outside air duct 202, wherein the outside air is mixed with recirculated air from recirculation duct 208, producing a mixture of outside air and recirculated air referred to herein as "supply air." Supply air is drawn through supply air duct 204 into the occupied space.

Return air is drawn from the occupied space via return air duct 206. A portion of the air within return air duct 206 is diverted into recirculation air duct 208 and mixed with the outside air to produce the supply air; that portion of the return air within return air duct 206 which is not diverted into recirculation duct 208 is exhausted from the system.

In order to comply with appropriate ASHRAE Standards, such as ASHRAE Standard 62-1989, as well as to generally maintain the overall comfort and health of building occupants, it is desirable to control the amount of outdoor air which makes up the supply air. Indeed, in those municipalities which have adopted ASHRAE Standard 62-1989 into their local building codes, building operators may be required to maintain predetermined minimum levels of outdoor air in the supply air.

As previously discussed, the volume flow rate of outside air into a building is generally a function of, inter alia, the type of environment within the building (e.g., office, industrial, residential) and the number of occupants within the building. For example, the ASHRAE standard for an office building requires 20 cubic feet per minute (CFM) per person. Thus, if one hundred people are expected to be in a particular office building, an outdoor air volume flow rate of 2,000 CFM should be maintained. As building occupancy fluctuates, for example during the early morning when people typically arrive for work and during lunch time and at the end of the day when people often leave the building, the desired outdoor air volume flow rate should also fluctuate accordingly. Building operators must thus coordinate the desired outdoor air volume flow rates with various other considerations such as maintaining a desirable temperature, humidity, and particulate concentration within the building, with a need to satisfy the applicable ASHRAE Standards in an energy efficient and, hence, cost efficient manner.

The present inventors have proposed a mass flow balance relationship which permits the indirect determination of outdoor air volume flow rate based on, inter alia, the concentration of a trace or tracer (test) gas at various points within HVAC System 200.

More particularly, in accordance with one aspect of the present invention, a non-toxic, physiologically harmless trace gas may be injected into the return air within return air duct 206. The particular trace gas employed should be one which either has a known, generally constant concentration in outdoor air, or one which is not present in outdoor air at all.

Assuming the trace gas injected into the return air is uniformly distributed within the return air, the concentration of the trace gas within recirculation duct 208 will be the same as the concentration of the trace gas within return duct 206. Since the concentration of trace gas within the outside air is known, or can be readily determined, the concentration of the trace gas within supply duct 204 is indicative of the ratio of outdoor air to (recycled) return air within supply conduit 204. The following equation sets forth this relationship:

$$CFM_{oa} = \left( \frac{G_{ra} - G_{sa}}{G_{ra} - G_{oa}} \right) \cdot CFM_{sa} \quad \text{Equation (1)}$$

where $CFM_{oa}$ and $CFM_{sa}$ correspond to the volume flow rates (in cubic feet per minute) of the outside air (oa) and supply air (sa), respectively; $G_{ra}$ corresponds to the trace gas concentration of the return air; $G_{sa}$ corresponds to the trace gas concentration in the supply air; and $G_{oa}$ corresponds to the concentration of the trace gas in the outdoor air.

The present inventors have determined that carbon dioxide ($CO_2$) 1 produced by humans during respiration, is a particularly useful trace gas for a number of reasons. For example, the $CO_2$ concentration of outside air remains fairly constant over short periods of time and is fairly uniform throughout the United States, ranging from approximately 370 to 440 parts per million (ppm), and generally about 400 (ppm) depending on location.

Accordingly, the flow volume rate of outdoor air into a HVAC system 200 may be determined as a function of the flow volume rate of supply air, which is easily measured directly, and the ratio of the difference between return air $C0_2$ concentration and supply air $CO_2$ concentration to the difference between return air $CO_2$ concentration and outside air $CO_2$ concentration:

$$CFM_{oa} = \left( \frac{CO_{2ra} - CO_{2sa}}{CO_{2ra} - CO_{2oa}} \right) \cdot CFM_{sa} \quad \text{Equation (2)}$$

where $CFM_{oa}$ and $CFM_{sa}$ are as previously defined; $CO_{2ra}$ corresponds to the $CO_2$ concentration in the return air; $CO_{2sa}$ corresponds to the $CO_2$ concentration in the supply air; and $CO_{2oa}$ corresponds to the $CO_2$ concentration within the outside air.

With continued reference to FIG. 2, a supply air volume flow rate sensor 210 is advantageously disposed within supply air duct 204 a sufficient distance from the point at which return air and outside air are mixed together, thus ensuring substantially constant air velocity (and hence velocity pressure) throughout the cross-sectional area of supply duct 204 in the vicinity of sensor 210.

Referring now to FIG. 3, those skilled in the art will appreciate that the point at which return air is exhausted from the building, indicated at point 206A in FIG. 3, is often located in close proximity to the point at which outdoor air is drawn into the system, indicated at point 202A. In such installations, return air which is exhausted from return air duct 206 at point 206A is reingested into the system at intake point 202A, a phenomenon known as short cycling. When short cycling occurs, the "outdoor" air entering outdoor air duct 202 is actually a combination of true (fresh) outdoor air and exhausted return air. For installations where the return air exhaust grill is closely proximate to the outdoor air intake grill, a significant amount of short cycling can occur.

In accordance with one aspect of the present invention, the general principle of the mass flow relationship set forth in Equation (2) may also be applied to the short cycling phenomenon shown in FIG. 3. In particular, an analysis at point B in FIG. 3 yields the following relationship.

$$CFM_{fa} = \left( \frac{CO_{2ra} - CO_{2oa}}{CO_{2ra} - CO_{2fa}} \right) \cdot CFM_{oa} \quad \text{Equation (3)}$$

where $CFM_{fa}$ corresponds to the volume flow rate of fresh air, i.e., outdoor air which contains no short cycled return air; $CFM_{oa}$ corresponds to the volume flow rate of the mixture of fresh air and short cycled return air; $CO_{2ra}$ corresponds to the $CO_2$ concentration of the return air; $CO_{2fa}$ corresponds to the $CO_2$ concentration of the fresh air (not commingled with short cycled return air); and $CO_{2oa}$ corresponds to the $CO_2$ concentration of the outside air, namely, the fresh air commingled with short cycled return air. If Equations (2) and (3) are combined and simplified, Equation (4) results:

$$CFM_{fa} = \left( \frac{CO_{2ra} - CO_{2sa}}{CO_{2ra} - CO_{2fa}} \right) \cdot CFM_{sa} \quad \text{Equation (4)}$$

The amount of fresh air entering the building can be calculated via Equation (4). The percentage of fresh outdoor air entering supply duct 204 can be calculated by the ratio of differentials in Equation (4) as follows:

$$\% FOA = \left( \frac{CO_{2ra} - CO_{2sa}}{CO_{2ra} - CO_{2fa}} \right) \quad \text{Equation (5)}$$

where %FOA is the percentage of fresh (non short cycled) outside air entering the system.

It is significant to note that direct flow measurement techniques (air flow stations) are not able to detect or compensate for the effect of air short cycling between the exhaust and outdoor air streams or between the return and mixed air streams, inasmuch as direct measurement techniques typically monitor air velocity and/or pressure.

Moreover, in circumstances wherein a tracer gas is used which is either not present in outdoor air or which is substantially constant over time in outdoor air, it is sufficient to monitor the $CO_2$ concentrations of only the return air and supply air in the context of Equation 4; the known value may simply be inserted in lieu of the variable $CO_{2fa}$.

Since the percentage of fresh outdoor air is equal to the ratio in Equation (5), the fresh outdoor air flow rate can be determined by multiplying this ratio by the supply air flow rate (i.e., Equation (4)). As stated earlier, the supply air flow rate is typically determined with greater ease than the fresh air flow rate due to such factors as, for example, low fresh air intake velocity necessitated by environmental factors (wind, snow, rain, debris). Moreover the typically short length of the fresh air duct creates turbulent pressure and velocity characteristics within the fresh air duct. The supply air duct, in contrast, has a higher air velocity and is typically of a relatively longer length than the fresh air duct, such that the supply duct functions as a flow straightener permitting the sensing of air pressure (and hence air velocity) with relative ease.

Figure 4:
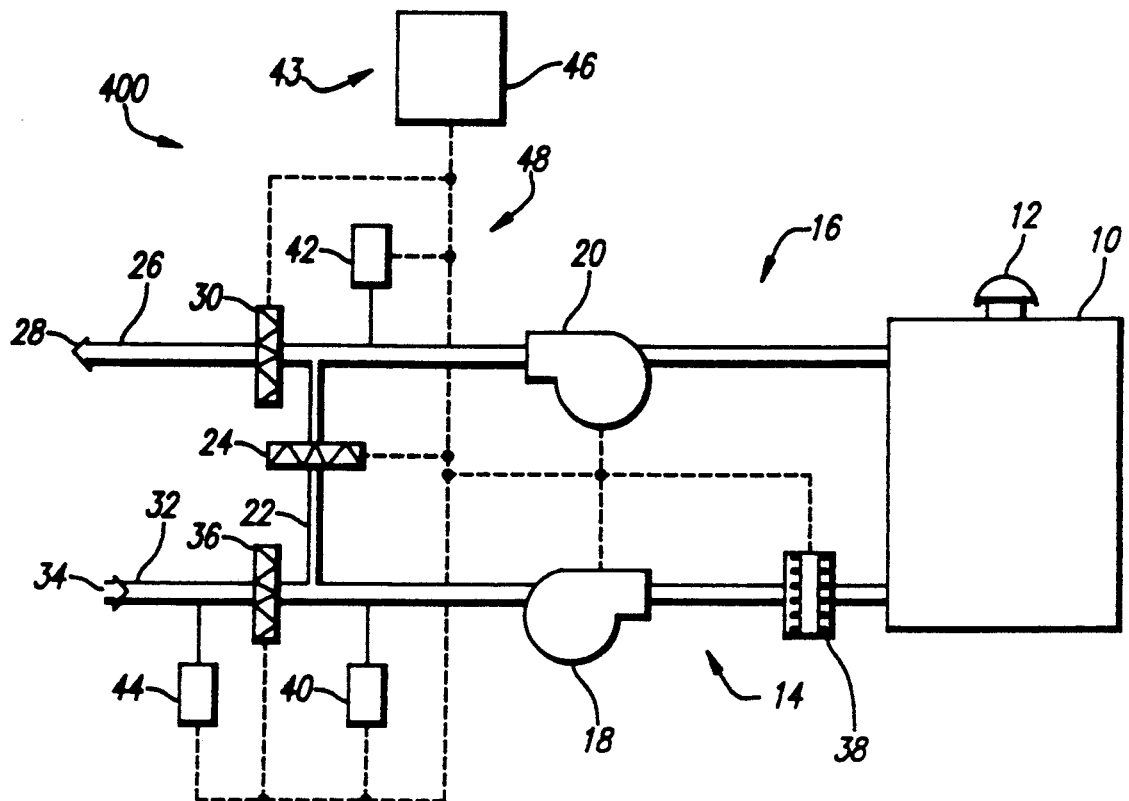
FIG. 4 is a schematic diagram illustrating the manner in which the present invention may be implemented in hardware form in accordance with a first preferred embodiment of the present invention.

Referring now to FIG. 4, a preferred embodiment of the present invention is illustratively implemented in the context of an exemplary HVAC system 400. System 400 suitably comprises a supply air duct 14 having a supply fan 18 disposed in cooperation therewith, a return air duct 16 having a return fan 20 cooperating therewith, a structure 10 (e.g., office building) having a mechanical exhaust 12 associated therewith, a recirculation duct 22, an exhaust duct 26 having an exhaust outlet 28 disposed at the end thereof, and an outside air duct 32 having an outside air inlet 34 disposed at the end thereof. HVAC system 400 further comprises a control system 43 including a controller 46, a control bus 48, a return air sensor 42 disposed to sense air within return duct 16, a supply air sensor 40 disposed to sense supply air within supply air duct 14, and an outside air sensor 44 disposed to sense the outside air within outside air duct 32. In the context of the embodiments discussed herein, the outside air within outside air duct 32 "upstream" of recirculation duct 22 is referred to as "outside air" inasmuch as it may contain a variable quantity of short cycled return air (see FIG. 3); outside air is distinguished from "fresh air" which is not commingled with short cycled return air.

Control system 43 further comprises a recirculation damper 24 disposed in cooperation with recirculation duct 22, an exhaust damper 30 disposed in cooperation with exhaust duct 26, and an outside damper 36 disposed in cooperation with outside air duct 32. An airflow station 38 is suitably disposed in cooperation with supply air duct 14 to monitor the volume flow rate of the supply air into structure 10.

By controlling the degree closure of respective dampers 30, 24, and 36, controller 46 controls the volume flow rate of outside air into structure 10 in accordance with, inter alia, the relationship set forth in Equation (4).

Those skilled in the art will appreciate that structure 10 includes conventional ventilation duct work and other known distribution media (not shown). In addition to the ventilation processes carried on by HVAC system 400, a certain amount of air is inevitably exhausted from structure 10 by way of one or more mechanical exhaust structures, for example, kitchen and bathroom exhaust fans and drain vents. Typical structures also exfiltrate and infiltrate ventilation air through various cracks, porous surfaces, interstices, ceilings, floors, walls, chimneys, and open windows.

Although supply fan 18 is suitably configured to urge supply air into structure 10 and return fan 20 is configured to draw return air from structure 10, those skilled in the art will appreciate that any suitable configuration of fans or the like may satisfactorily circulate ventilation air through structure 10. For example, one or more fans may be used at various points along one or more of supply air duct 14, structure 10, and return air duct 16 in addition to or in lieu of respective fans 18 and 20.

During normal operation, outside air is drawn into outside air duct 32, whereupon the trace gas (e.g., $CO_2$) concentration of the outside air is sensed by outside air sensor 44. Outside air sensor 44 sends a signal indicative of the trace gas concentration of the outside air to controller 46. As the outside air passes through outside air duct 32, i.e., from left to right in FIG. 4, it is mixed with recycled return air from recirculation duct 22, whereupon the resultant supply air (i.e., the mixture of outside air and recirculated return air) is drawn through supply air duct 14. Supply air sensor 40 is configured to sense the trace gas concentration within supply air duct 14 and transmit a signal indicative of the trace gas concentration to controller 46. Depending on the type of sensor employed in air flow station 38, a parameter of the supply air is sensed and a signal indicative thereof is transmitted by air flow station 38 to controller 46. For example, if air flow station 38 comprises a pitot tube, a pressure signal indicative of volume flow rate ($CFM_{sa}$) may be transmitted from air flow station 38 to controller 46.

The supply air is introduced into structure 10 via supply air duct 14 and circulated throughout structure 10 by conventional air circulation duct work (not shown). Return air sensor 42 is configured to sense the trace gas concentration of the return air expelled from structure 10 and flowing through return air duct 16. Return air sensor 42 transmits a signal indicative of the return air trace gas concentration to controller 46. Depending on the degree of closure of respective dampers 24, 30, and 36, a portion of the return air is recirculated back into structure 10 by way of recirculation duct 22; the remaining portion of the return air which is not recirculated is expelled from HVAC system 400 at exhaust outlet 28. As previously discussed in conjunction with FIG. 3, it is conceivable that some amount of the return air exhausted from exhaust outlet 28 may short cycle back into outside air inlet 34.

As noted previously, and as will be appreciated by those skilled in the art, any suitable gas may be used as a trace or test gas in the context of the present invention. In a preferred exemplary embodiment, $CO_2$ is used as the trace gas. That being the case, one or more of respective sensors 40, 42 and 44 suitably comprise a non-dispersive infrared or photo-acoustic $CO_2$ sensor suitably configured to produce a voltage output corresponding to the concentration of $CO_2$ in the air surrounding a sensor.

Controller 46 is coupled to supply fan 18, return fan 20, recirculation damper 24, exhaust damper 30, outside damper 36, air flow station 38, mixed air sensor 40, return air sensor 42 and outside air sensor 44 by means of control bus 48. Controller 46 thus communicates control signals over control bus 48 to direct the operation of supply fan 18, return fan 20, recirculation damper 24, exhaust damper 30, and outside damper 36. In addition, controller 46 receives control signals over control bus 48 from air flow station 38, mixed air sensor 40, return air sensor 42 and outside air sensor 44.

Figure 5:
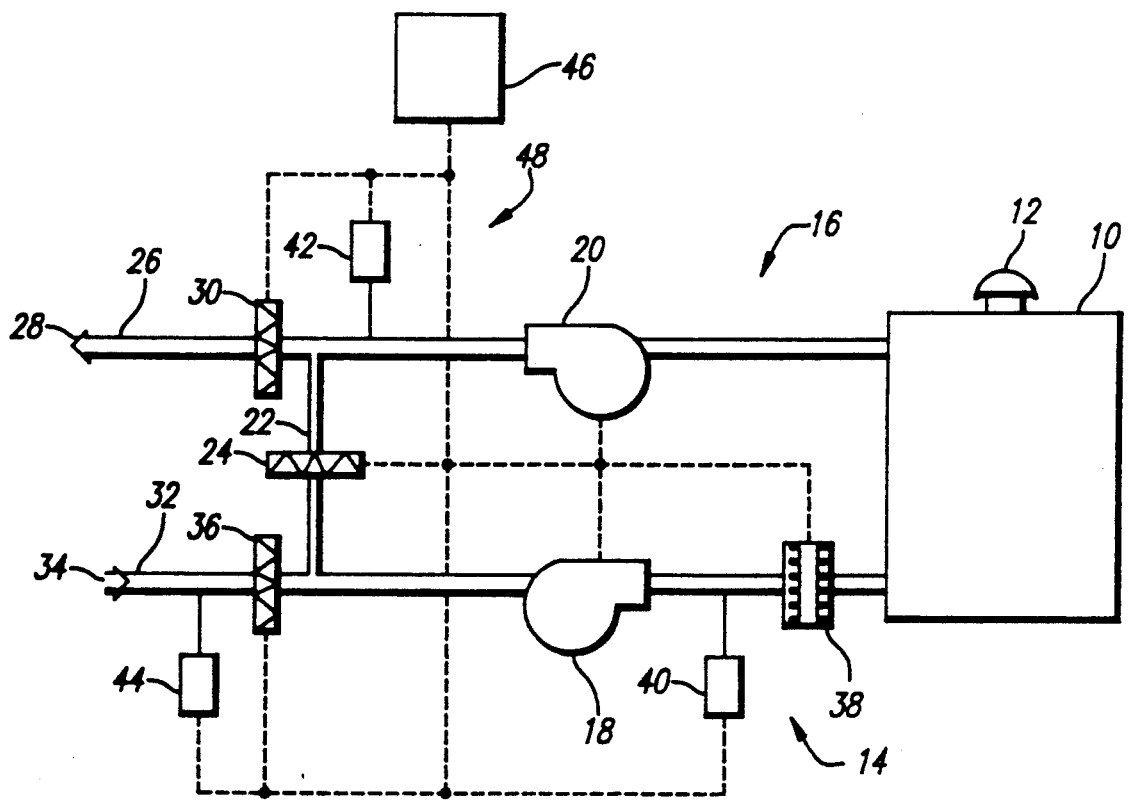
FIG. 5 is a schematic diagram illustrating the manner in which the present invention may be implemented in accordance with another preferred embodiment.

With momentary reference to FIG. 5, an alternative embodiment of the present invention may be configured such that supply air sensor 40 is coupled to supply duct 14 between supply fan 18 and structure 10. The embodiment shown in FIG. 5 may be preferred in situations where stratification of the mixed air in supply duct 14 may occur. For example, when both recirculation damper 24 and outside damper 36 are open, the mixed air tends to become stratified. The mixed air may not be well-mixed until it is a considerable distance downstream from the mixing point.

Stratification of temperatures in supply ducts is well known; because heat transport in gases occurs by kinetic energy transfer between gas molecules, temperature stratification further contributes to the stratification of $CO_2$ concentration. As such, the turbulence introduced by supply fan 18 coupled with the additional time for diffusion to occur ensures a homogeneous air mixture and an accurate measurement of $CO_2$ concentration by mixed air sensor 40.

Figure 6:
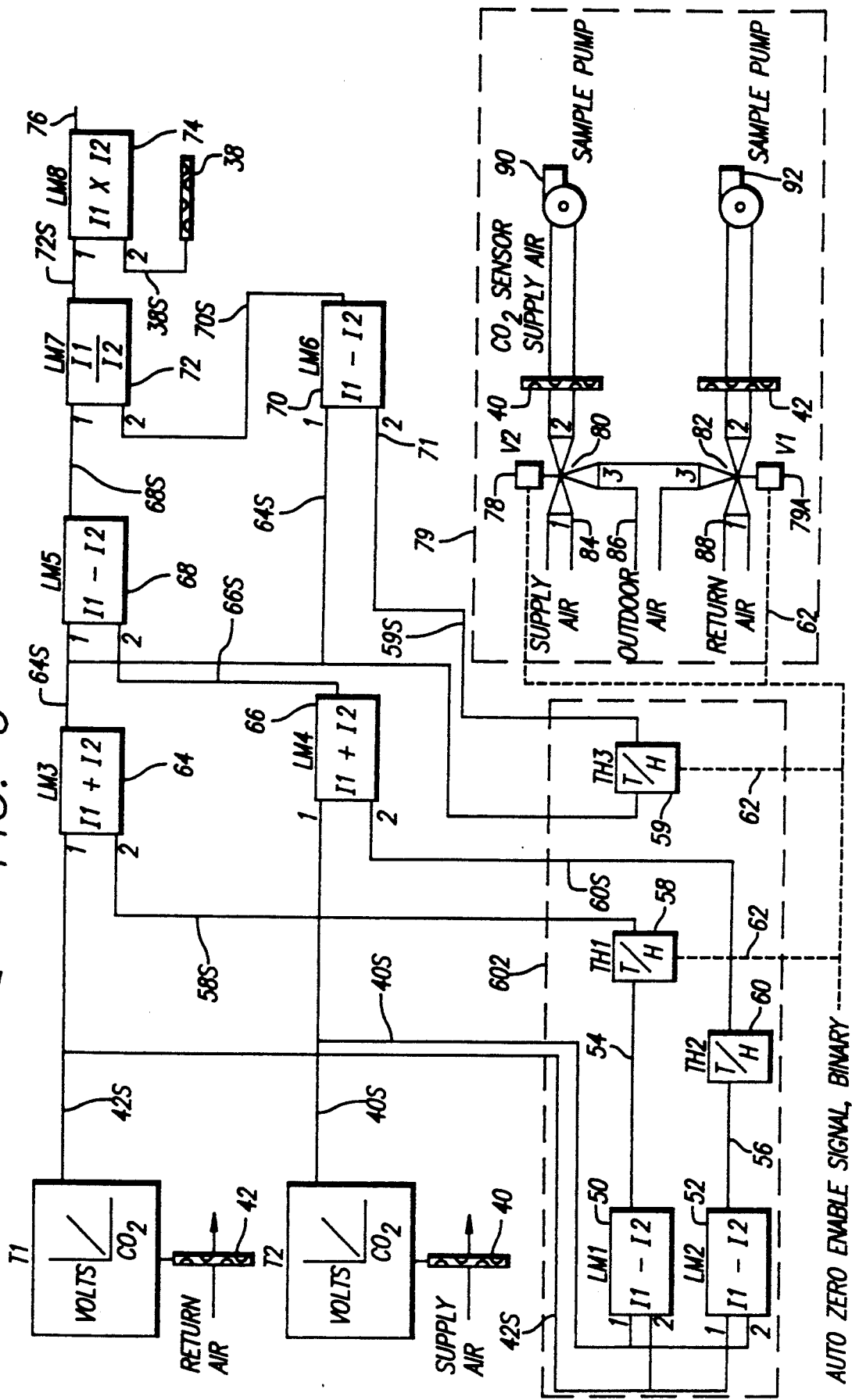
FIG. 6 is a schematic control logic diagram illustrating the manner in which the present invention may be implemented in accordance with a preferred embodiment.

Referring now to FIG. 6, the functions of controller 46 may be implemented in any suitable hardware configuration. In accordance with a preferred embodiment of the invention, the functions of controller 46 are implemented in a logic flow circuit 600 comprising an auto-zero logic circuit 602, an auto-zero manifold control 79, respective adders 64, 66, respective subtractors 68, 70, a divider 72, and a multiplier 78.

Supply air sensor 40 produces and outputs a signal 40S indicative of the trace gas (e.g. $CO_2$ concentration of the supply air; return air sensor 42 produces an output signal 42S indicative of the trace gas (e.g. $CO_2$) concentration in the return air. Respective output signals 40S and 42S are applied to auto-zero logic circuit 602, discussed in greater detail below. In addition, return air output signal 42S is applied to pin one (1) of adder 64; similarly, supply air output signal 40S is applied to pin one (1) of adder 66. As is discussed in greater detail below in conjunction with auto-zero logic circuit 602, a first bias signal 58S is applied to pin two (2) of adder 64, and a second bias signal 60S is applied to pin two (2) of adder 66.

Return air output signal 42S and first bias signal 58S are suitably combined by adder 64 to produce an effective return air concentration signal 64S. Similarly, supply air output signal 40 and second bias signal 60S are combined by adder 66 to produce an effective supply air concentration signal 66S.

Return air concentration signal 64S and supply air concentration signal 66S are applied to subtractor 68. Subtractor 68 produces a first differential signal 68S indicative of the difference between effective return air concentration signal 64S and effective supply air concentration signal 66S ($CO_{2ra} - CO_{2sa}$). The output of subtractor 68, namely first differential signal 68S, corresponds to the numerator in Equations (4) and (5).

The denominator in Equations (4) and (5) is generated by subtractor 70 in the following manner. Effective return air concentration signal 64S is applied to pin one (1) of subtractor 70. A trace gas concentration reference signal 59S, discussed in greater detail below in connection with auto-zero logic circuit 602, is applied to pin two (2) of subtractor 70. Subtractor 70 computes the difference between effective return air concentration signal 64S and reference signal 59S, and produces a second differential signal 70S indicative of the difference therebetween ($CO_{2ra} - CO_{2fa}$). Second differential signal 70S, which corresponds to the numerator in Equations (4) and (5), is applied pin two (2) of divider 72.

Divider 72 suitably computes the ratio of output signal 68S to output signal 70S, namely:

$$\left( \frac{CO_{2ra} - CO_{2sa}}{CO_{2ra} - CO_{2fa}} \right)$$

Divider 72 produces an output signal 72S corresponding to the ratio of first differential signal 68S and second differential 70S, and applies output signal 72S to pin one (1) of multiplier 74.

Airflow sensor 38 produces a signal indicative of the volume flow rate of supply air through supply air duct 14 (FIGS. 4-5), and applies an output signal 38S indicative of supply air volume flow rate ($CFM_{fa}$) to pin two of multiplier 74. Multiplier 74 effectively multiples output signal 72S by output signal 38S to produce an analog outdoor volume signal 76 corresponding to the quantity $CFM_{fa}$ in Equation (4).

The amplitude of analog outdoor volume signal 76 is suitably linearly proportional to the volume flow rate of fresh air ($CFM_{fa}$) flowing through outdoor air conduit 32. Those skilled in the art will appreciate that analog output volume signal 76 may be utilized by control system 43 to control the action of circulation fans (e.g. fans 18, 20) and to control the degree of closure of one or more of respective dampers 24, 30, and 36 to maintain a desired volume flow rate of fresh air into system 400. Those skilled in the art will also appreciate that the various output signals discussed herein suitably comprise voltage or current levels and may be in digital or analog form depending on the particular hardware selected to implement circuit 600.

With continued reference to FIG. 6, the function of auto-zero logic 602 will now be described.

The accuracy with which conventional trace gas sensors (e.g. $CO_2$ sensors) measure a quantity and produce a corresponding output signal indicative of the magnitude of the measured quantity is often specified in terms of a quantifiable error attributable to such factors as offset, bias, linearity, and the like. Although offset error may comprise a substantial portion (e.g. 67%) of total sensor error, offset error may be correctable by conventional field calibration techniques. The present inventors have determined that while Equations (4) and (5) yield very accurate theoretical results, the use of these equations in monitoring the volume of fresh air flow brought into a building is subject to large errors in the calculated value of fresh air flow as a result of relatively small errors in the accuracy of the sensing devices used to measure the various $CO_2$ concentration levels.

Figure 8:
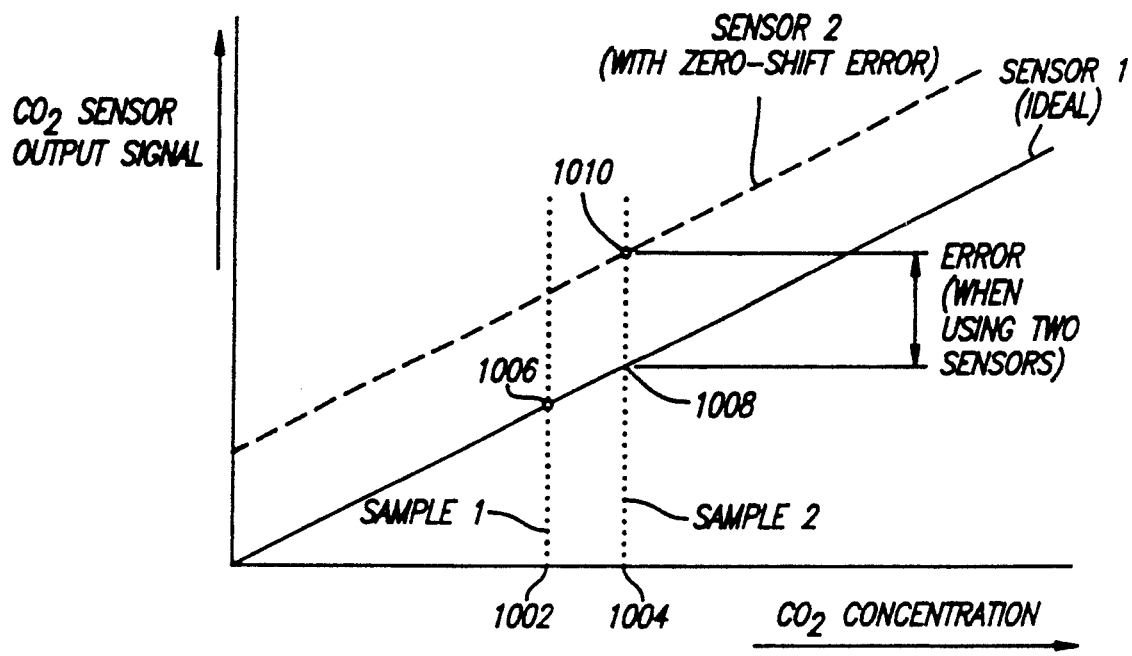
FIG. 8 is a graphical depiction of zero-shift error.
Figure 9:
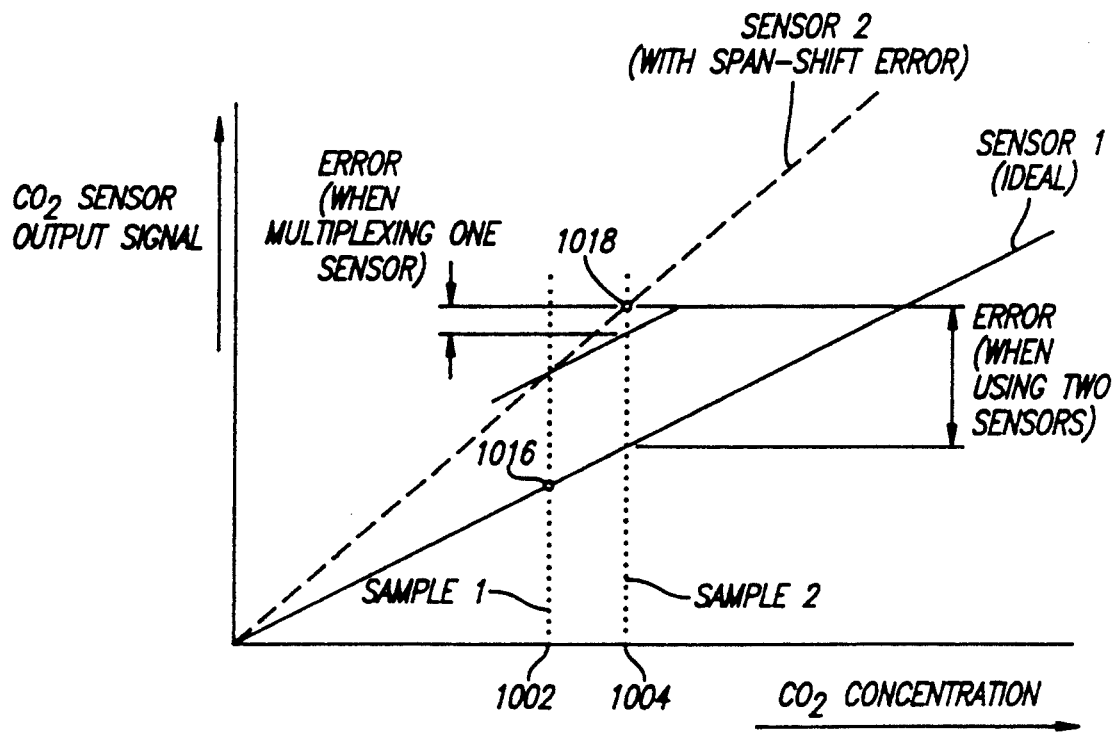
FIG. 9 is a graphical depiction of span-shift error.

More particularly and with momentary reference to FIGS. 8 and 9, presently known gas concentration sensors typically vary from one sensor to another in several respects. For example, a typical sensor may produce an output signal equal to the actual sensed parameter, plus or minus the sensor error, where the sensor error includes, among other things, zero-shift error (offset error) and span-shift error.

With particular reference to FIG. 8, assume an ideal sensor 1 produces an output exactly equal to the actual $CO_2$ value; that is, sensor 1 does not exhibit any zero-shift error or span-shift error. Sensor 2, on the other hand, exhibits both a zero-shift error and a span-shift error. If sensors 1 and 2 are used to measure different parameters used in Equation (4), the zero-shift and span-shift error exhibited by sensor 2 will be reflected in the calculated value of $CFM_{fa}$. Specifically, assume that sensor 1 is used to measure a return air $CO_2$ concentration level (point 1006), and that sensor 2 is used to measure, e.g., a supply air $CO_2$ concentration level (point 1010). Assume further that the actual value of the return air $CO_2$ concentration is defined by point 1002, and that the actual value of the supply air concentration level is defined by point 1004. Using sensors 1 and 2 to measure these two $CO_2$ levels will result in the zero-shift error exhibited by sensor 2 being incorporated into the calculated difference (e.g., $CO_{2ret} - CO_{2sa}$). That is, the calculated difference between the return and supply air $CO_2$ concentration levels will exhibit an error component equal to the zero-shift error exhibited by sensor 2.

Similarly, any span-shift error exhibited by sensor 2 will also be reflected in the calculated difference between the concentration levels sensed by sensors 1 and 2. With particular reference to FIG. 9, assume again that sensor 1 is used to measure the return air $CO_2$ concentration level (point 1016), and that sensor 2 is used to measure a supply air $CO_2$ concentration level (point 1018). Assume further that the actual value of the supply air $CO_2$ level is defined by point 1004, and that the actual value of the return air $CO_2$ level is defined by point 1002. When using sensors 1 and 2 to calculate the difference between the return and supply air concentration levels, the span-shift error exhibited by sensor 2 will be reflected in the calculated difference between the foregoing quantities. As can be seen in FIG. 9, the magnitude of the error in calculating this difference increases for increased values of either quantity.

The present inventors have determined that intrinsic sensor error attributable to, for example, zero-shift error may be substantially reduced in accordance with the auto-zero function of the present invention. Moreover, the present inventors have also determined that span-shift error may be substantially eliminated in the single sensor embodiments discussed below in conjunction with FIGS. 7-12.

The auto-zero function of the present invention essentially biases the output of one of adders 64 and 66 as necessary to compensate for any difference between respective output signals 40S and 42S when both sensors are sensing air from the same source.

Returning now to FIG. 6, auto-zero logic circuit 602 suitably comprises respective subtractors 50, 52, and respective track and hold circuits 58, 59, and 60.

Return air output signal 42S is suitably applied to pin two (2) of subtractor 50 and to pin one (1) of subtractor 52; supply air output signal 40S is suitably applied to pin one (1) of subtractor 50 and to pin two (2) of subtractor 52. Subtractor 50 produces an output signal 54 indicative of the difference between the $CO_2$ concentration levels of the supply air and the return air ($CO_{2sa} - CO_{2ra}$). Subtractor 52 produces an output signal 56 indicative the difference between the $CO_2$ concentration levels of the return air and supply air ($CO_{2ra} - CO_{2sa}$).

Output signal 54 is applied to track and hold module 58; output signal 56 is applied to track and hold module 60. In the illustrated embodiment, respective subtractors 50 and 52 are capable of producing only outputs corresponding to values greater than zero. For example, if the value of supply air output signal 40S (applied to pin one (1) of subtractor 50) is greater than the value of return air output signal 42S (applied to pin two (2) of subtractor 50), output signal 54 will comprise a positive dc voltage level indicative of the difference between the respective input values. If, on the other hand, supply air output signal 40S is less than return air output signal 42S, such that subtraction would yield a negative number, the output signal 54 of subtractor 50 will have a zero value.

Control system 43 cooperates with auto-zero manifold control 79 to control the mode of operation of auto-zero logic circuit 602. Specifically, manifold control 79 applies an enable signal 62 to each of respective track and hold modules 58, 59 and 60. When enable signal 62 exhibits a first value (e.g., a positive value or binary "1"), each of the respective track and hold modules 58, 59 and 60 are enabled and produce an output signal equal to its corresponding input signal value. When the value of enable signal 62 is such that the track and hold circuits are disabled, for example when the value of enable signal 62 is either negative or a binary zero, respective track and hold circuits 58, 59 and 60 "save" their then current value and continue to generate an output signal equal to the value of its input signal at the time it was disabled. Stated another way, when a track and hold module is enabled, its output follows its input; when a track and hold module is disabled, it generates a constant output signal equal to the value of its input signal at the time it was disabled, for so long as it remains disabled.

As previously noted, output signal 58S produced by track and hold module 58 is applied to pin two (2) of adder 64, and output signal 60S produced by track and hold module 60 is applied to pin two (2) of adder 66. This is so regardless of whether track and hold modules 58, 60 are enabled or disabled.

The auto-zero mode is initiated by controller 46. More particularly, controller 46 manipulates auto-zero manifold 79 in the following manner. With reference now to FIGS. 4 and 6, manifold control 79 suitably comprises a supply air sample tube 84 coupled to supply duct 14, an outdoor air sample tube 86 coupled to outside duct 32, and a return air sample tube 88 coupled to return air duct 16. Manifold control 79 further comprises a supply air valve 80 configured to selectively port either supply air from supply air sample tube 84, or outdoor air from outdoor air sample tube 86 to sensor 40. For this purpose, manifold control 79 suitably comprises a supply air sample pump 90 to ensure adequate airflow through supply air sensor 40.

Manifold control 79 further comprises a return air valve 82 configured to selectively port either return air from return air sample tube 88, or outdoor air from outdoor air sample tube 86 to sensor 42. For this purpose, manifold control 79 further comprises a sample pump 92 configured to ensure adequate flow of sampled air through return air sensor 42.

During normal steady state operation of HVAC system 400 (i.e., when the system is not in the auto-zero mode), valve 80 is configured to port supply air from supply air sample tube 84 to sensor 40, and valve 82 is configured to port return air from return air sample tube 88 to sensor 42. The position of valves 80 and 82 is suitably controlled by respective actuator valves 78 and 79A, each of which is preferably configured to receive auto-zero enable signal 62 from controller 46.

During the auto-zero mode of operation, controller 46 applies enable signal 62 to, inter alia, respective valve actuators 78 and 79A to place respective valves 80 and 82 into the auto-zero mode of operation. More particularly, in the auto-zero mode of operation, valve 80 is configured to port outdoor air from outdoor air sample tube 86 (rather than supply air) to sensor 40, and valve 82 is configured to port outdoor air (rather than return air) to sensor 42. The positions of valves 80 and 82 during steady state (normal mode) and the auto-zero mode of operation respectively, are set forth below in Table 1.

TABLE 1

| VALVE POSITION: | |
|---|---|
| NORMAL MODE: | 1-2 |
| AUTO ZERO MODE: | 3-2 |

When auto-zero manifold control 79 is placed in the auto-zero mode of operation, supply air sensor 40 and return air sensor 42 are simultaneously calibrated to produce an output signal indicative of the $CO_2$ concentration of the outside air. Also during the auto-zero mode of operation, track and hold modules 58 and 60 are unlatched (enabled) and, hence, track their input values. Those skilled in the art will appreciate that the system should remain in the auto-zero mode long enough to purge return air and supply air from manifold control 79 and to ensure a steady supply of outdoor air to respective sensors 40 and 42. The system should further remain in the auto-zero mode of operation long enough to ensure that respective sensors 40 and 42 reach equilibrium with the $CO_2$ concentration of the outdoor air, permitting the output signal produced by respective sensors 40 and 42 to "settle out." Depending on the particular sensor employed, this purging process ranges from approximately 20 seconds to approximately five minutes.

Because supply air sensor 40 and return air sensor 42 simultaneously measure the $CO_2$ concentration level of the outdoor air flowing therethrough, output signal 42S of return air sensor 42 and output signal 40S of supply air sensor 40 are theoretically equal to each other and of a voltage level indicative of the $CO_2$ level of outdoor air. However, due to the intrinsic zero-span (offset) error often associated with such sensors, the output values of return air sensor 42 and supply air sensor 40 may not necessarily be exactly equal during the auto-zero mode of operation.

More particularly, during the auto-zero mode of operation, the output voltage of return air sensor 42 corresponds to $CO_{2oa} + e_{ra}$, and the output voltage of supply air sensor 40 corresponds to $CO_{2oa} + e_{sa}$, where $e_{ra}$ and $e_{sa}$, represent the intrinsic errors of respective sensors 42 and 40. As previously noted, subtractor 50 determines the difference between supply air output signal 40S and return air output signal 42S. If the difference $(CO_{2ea} - CO_{2ra})$ is positive, output signal 54 indicative of the difference is applied to track and hold module 58. If the difference is negative, a value of zero is applied to track and hold module 58.

Similarly, if the difference between return air output signal 42S and supply air output signal 40S $(CO_{2ra} - CO_{2sa})$ is positive, subtractor 52 produces an output signal 56 indicative of this difference and applies output signal 56 to track and hold module 60. If the difference is negative, a value of zero is applied to track and hold module 60.

During auto-zero mode, return air output signal 42S is either equal to or different from supply air output signal 40S. If both sensors 40 and 42 exhibit either the same degree of zero-shift error or if neither sensor exhibits any zero-shift error, output signal 42S and output signal 40S will be equal. If output signals 42S and 40S are equal, the respective outputs of subtractors 50 and 52 will be zero, as will respective output signals 58S and 60S from respective track and hold modules 58 and 60. In that event, neither sensor 40 nor 42 will be biased, and upon the transition from auto-zero mode to steady state mode, the voltage values at pin two (2) of adder 64 and at pin two (2) of adder 66 will equal zero, such that effective return air concentration signal 64S and effective supply air concentration signal 66S both reflect the actual outputs of return air sensor 42 and supply air sensor 40, respectively. In other words, there is no need to bias the actual output of either sensor 40 or sensor 42 if both sensors yield the same output for the same input.

If, on the other hand, return air output signal 42S is not equal to supply air output signal 40S during the auto-zero mode, this means that one of sensors 40 or 42 exhibits a zero-offset error with respect to the other sensor. In the context of the present invention, the accuracy with which either sensor measures actual $CO_2$ concentration levels is simply not germane; since the relative error between sensors 40 and 42 is effectively compensated for by the auto-zero mode, and further since Equation (4) utilizes a ratio of differences rather than absolute values of trace gas (CO2) concentration, it is unnecessary to accurately quantify the actual trace gas ($CO_2$) concentration level in accordance with one aspect of the invention.

If during auto-zero mode the value of return air output signal 42S is greater than the value of supply air output signal 40S, subtractor 50 will produce an output signal 54 indicative of the difference between return air signal 42S and supply air 42, while adder 52 generates a zero output. If, on the other hand, supply air output signal 40S is greater than return air output signal 42S, subtractor 52 will generate an output signal 56 indicative of the difference, while subtractor 50 will output zero. In any event, if return air output signal 42S is not equal to supply air output 40S, one of subtractors 50 and 52 will output a signal of zero value and the other will output a signal indicative of the difference. During auto-zero mode, track and hold module 58 will effectively apply the output (i.e., signal 54) of subtractor 50 to pin two (2) of adder 64 and transfer and hold module 60 will effectively apply the output (i.e., signal 56) of subtractor 52 to pin two (2) of adder 66.

When HVAC System 400 transitions from auto-zero mode to steady state operation, transfer and hold modules 58 and 60 are disabled. Transfer and hold module 58 effectively latches the then current value of output signal 58S at pin two (2) of adder 64; similarly, transfer and hold module 60 effectively latches the then current value of output signal 60S at pin two (2) of adder 66. These latch values remain constant until the system again enters the auto-zero mode of operation.

Output signal 64S of adder 64 is indicative of the effective value of the return air $CO_2$ concentration level. Similarly, output signal 66S of adder 66 is indicative of the effective value of the supply air $CO_2$ concentration level. By applying a non-zero biasing voltage to pin two (2) of either adder 64 or 66, which biasing signal is equal to the difference between return air output signal 42S and supply air output signal 40S during auto-zero mode, the biased adder effectively compensates for whichever sensor (i.e. sensor 40 or sensor 42) exhibits the lower output value during auto-zero mode.

As a specific example of the foregoing, if return air sensor 42 produces an output signal 42S indicative of 400 ppm during auto-zero mode, and supply air sensor 40 produces an output signal 40S indicative of 370 ppm, the output of subtractor 50 will be zero, while the output of subtractor 52 will be indicative of a 30 ppm differential (400−370=30 ppm). Thus, track and hold module 60 will apply an output signal 60S to adder 66 indicative of a 30 ppm error. In so doing, adder 66 is concomitantly upwardly biased by the amount needed to produce an effective supply air $CO_2$ concentration signal 66S which exactly equals the output of adder 64. Stated another way, the sensor (i.e., sensor 40 or 42) having the lower output signal during auto-zero mode should be biased upwardly by an amount sufficient to bring its effective output up to a value equal to the effective output of the unbiased sensor. Accordingly, the offset error of return air sensor 42 relative to supply air sensor 40 will be eliminated by biasing the sensor with the lowest output by an appropriate amount.

The manner in which outdoor air reference signal 59S is established will now be described.

Also during the auto-zero mode of operation, signal 64S from adder 64 is applied to track and hold module 59. During auto-zero mode, track and hold module 59 applies output signal 59S, which tracks the value of signal 64S, to pin two (2) of subtractor 70. During auto-zero mode (once the outputs of sensors 40 and 42 have stabilized), the output of adder 64 and, hence, output signal 59S, is indicative of the $CO_2$ concentration of outdoor air. Hence, upon transitioning from auto-zero mode to steady state operation, output signal 59S is latched by track and hold module 59 at its then current value, whereupon the constant value of output signal 59S is continually applied to pin two (2) of subtractor 70 until track and hold module 59 is again disabled (i.e. until the system again enters the auto-zero mode of operation). Inasmuch as the $CO_2$ concentration level of outside air remains relatively constant over short periods of time in a geographic area, it is generally sufficient to "recalibrate" outdoor reference signal 59S only during auto-zero mode.

Upon transitioning from auto-zero mode to steady state operation, one of adders 64 and 66 is appropriately biased to compensate for the relative difference (if any) between return air sensor 42 and supply air sensor 40. Thereafter, during steady state operation, output signal 64S, indicative of the effective return air $CO_2$ concentration level, and output signal 66S, indicative of the effective supply air concentration level, are subtracted in subtractor 68 to produce a signal 68S indicative of the numerator in Equation (4). At the same time, output signal 64S, indicative of the effective return air $CO_2$ concentration level, and output signal 59S, indicative of the outdoor air $CO_2$ concentration level, are applied to subtractor 70 to produce the denominator of Equation (4). The numerator (signal 68S) is divided by the denominator (signal 70S) by divider 72, and the quotient (signal 72S) is multiplied by signal 38S, indicative of supply air volume flow rate ($CFM_{sa}$). The output of multiplier 74, namely, analog outdoor volume signal 76, is indicative of fresh air flow volume, i.e. $CFM_{fa}$ in Equation (4).

The auto-zeroing mode is desirably initiated by controller 46 often enough to compensate for random sensor shifts, temperature induced sensor shifts, and for changes in outdoor $CO_2$ concentration.

Moreover, the outputs of supply air sensor 40 and return air sensor 42 are preferably biased to match the $CO_2$ concentration of outdoor air. Thus, the absolute accuracy is also substantially increased as well as the relative accuracy of the system.

In accordance with another aspect of the present invention, outdoor air flow is monitored with less hardware than in prior art systems. Because the $CO_2$ level of the outdoor air is generally constant over short period of time, a real time determination of the $CO_2$ concentration of the fresh outdoor air is not required to calculate the volume of the fresh outdoor air which enters the building. Rather, as discussed above, such determination can be made in connection with the auto-zero mode of operation if performed frequently. In contrast, a temperature based energy balance model requires that the outdoor air temperature be continually measured (since it is not constant). The necessity of measuring this additional input increases hardware costs and also creates an additional source of measurement error which will adversely affect the result of the energy balance.

Sensor placement is also simple and trouble free in accordance with a preferred embodiment of the invention, particularly when compared to systems which utilize a temperature based model. Because heating and cooling coils, humidifiers and other equipment, such as are utilized in manifold 79, do not deleteriously affect the $CO_2$ level of a sampled air stream, the $CO_2$ sensors can be located in any convenient and easily accessible section of the supply or return air ducts. In contrast, the temperature elements for a system utilizing an energy based model must typically be located at or near the mixed air plenum before the air is allowed to flow through any type of coil. As a result, stratification of air streams can cause significant temperature sensing errors.

Systems structured in accordance with the present invention do not require any special or extraordinary requirements for the layout and design of the outdoor air intake duct work or mixing plenum. Thus, the construction costs of a mechanical system incorporating the present invention will not be adversely affected. In comparison, to achieve comparable accuracy with known direct flow sensing techniques, extraordinary design and installation practices must be incorporated into the design of the outdoor air duct work and mixing plenum.

Carbon dioxide concentration is the preferred component for measurement in the outdoor, supply, and return air streams. $CO_2$ sensors are readily and commercially available. $CO_2$ concentrations are sufficiently high to ensure an accurate measurement regardless of the outdoor air temperature or any other independent variable. The $CO_2$ concentration of fresh outdoor air is relatively constant in the range of 370 to 440 ppm and the $CO_2$ concentration of return air is typically between 500 and 1000 ppm. Thus, the difference in $CO_2$ levels typically encountered in the outdoor, return and supply air streams is large enough so that reasonable accuracy may be provided. However, the present invention is not limited to $CO_2$ as a trace or test gas. Indeed, the relationship of Equation (4) is equally valid for other components, parameters, and characteristics of ventilation air.

The $CO_2$ model based system of FIG. 6 is also fault tolerant. If the $CO_2$ level of the return air approached the $CO_2$ level of the fresh outdoor air, the building or other structure would most likely be sparsely occupied, since the occupants themselves generate the $CO_2$. Therefore, any associated calculation errors become less significant because the ventilation codes are based on occupant density.

In an alternative embodiment, auto-zeroing may be implemented in a digital computer, for example in a microprocessor based digital controller. This embodiment would allow reduced cost and increased reliability. In such a microprocessor embodiment, the outputs of supply air sensor 40 and return air sensor 42 are preferably biased to match the $CO_2$ concentration of fresh outdoor air during the auto-zeroing operation. This provides the additional benefit of recalibration to a known reference which will increase the accuracy of the absolute measurement of the $CO_2$ concentrations. Even though a high degree of absolute accuracy is not required for implementation, it may be preferable to know the actual concentrations in addition to the relative differences between $CO_2$ concentrations which are used.

The present inventors have also determined, however, that even with the benefit of the auto-zero function, the multiple sensor implementation of Equation 4 may nonetheless yield unacceptable results due to the unacceptably high error reflected in the calculation of outdoor air volume flow rate. Thus, the following embodiments implement Equation 4 in a single sensor configuration, thereby eliminating sensor-to-sensor errors entirely.

Figure 7:
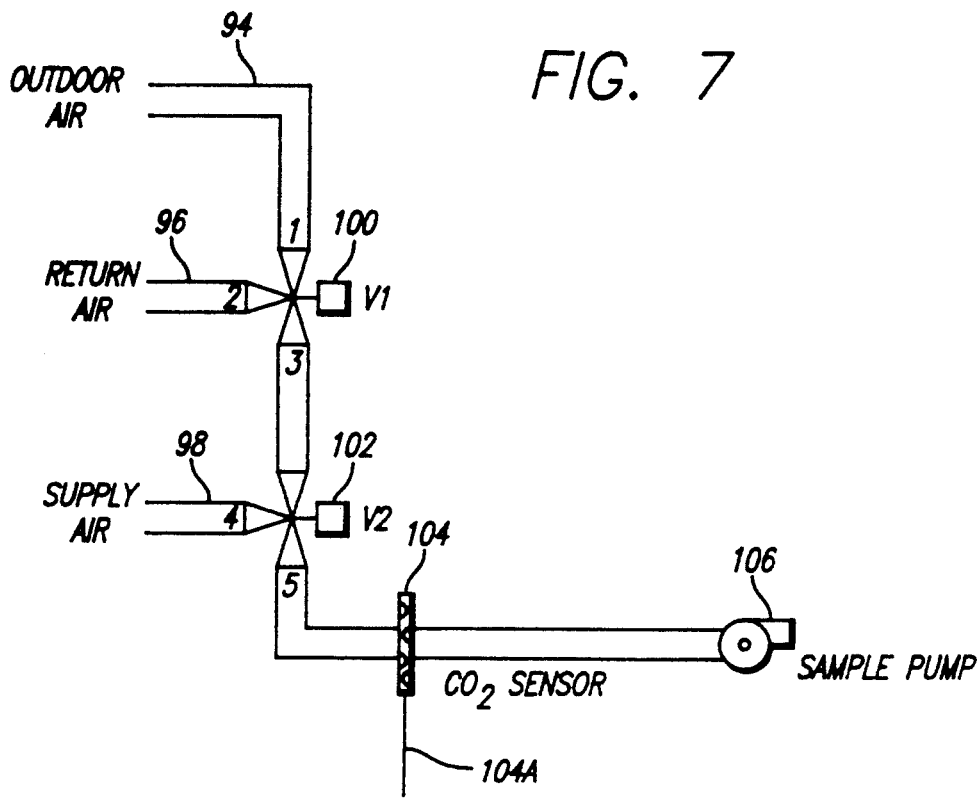
FIG. 7 is a schematic diagram illustrating a single sensor embodiment.
Figure 12:
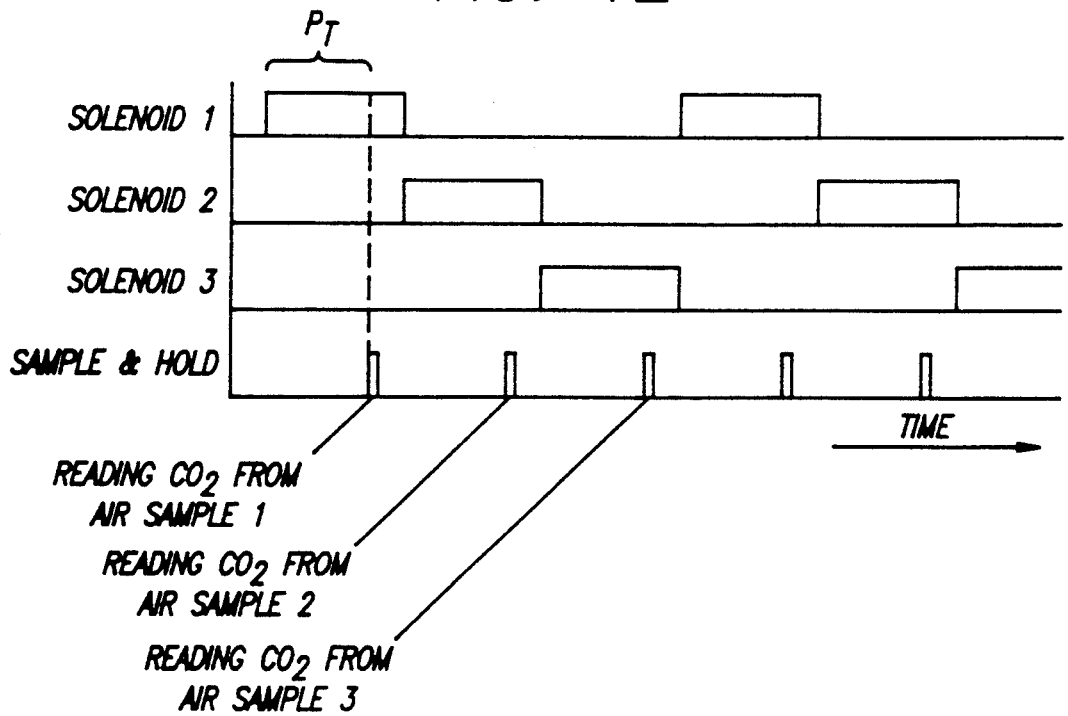
FIG. 12 is a graphical depiction of the timing sequence respecting the multiplexer shown in FIGS. 10 and 11.

Referring now to FIG. 7, an alternate preferred embodiment of the present invention surrounds the use of a single sensor to sequentially sense air samples from two or more sources. The use of a single sensor necessarily eliminates sensor-to-sensor variations and dramatically increases the accuracy with which Equation (4) may be implemented. Specifically, the use of a single sensor eliminates the effects of zero- and span-shift, random and temperature induced sensor output signal variations, and nonlinearities that affect implementations using multiple sensors.

With continued reference to FIG. 7, a first single sensor embodiment suitably comprises an outdoor air sample tube 94 coupled to outdoor air duct 32 (FIG. 4), a return air sample tube 96 coupled to return air duct 16, a supply air sample tube 98 coupled to supply air duct 14, respective valves 100 and 102, a sample pump 106, and a single trace gas (e.g., $CO_2$) sensor 104 configured to produce an output signal 104A indicative of the trace gas concentration of the air passing through sensor 104.

Inasmuch as the auto-zero mode of the previous embodiments is designed to reduce sensor-to-sensor variations, the function of the auto-zero mode of operation is rendered unnecessary in the context of a single sensor embodiment such as shown in FIG. 7. Thus, the operation of the single sensor embodiment will be described in the context of steady state operation.

During steady state operation, controller 46 manipulates Valves 100 and 102 in accordance with the valve positions set forth in Table 2 below to sequentially port outdoor air, return air, and supply air to sensor 104.

TABLE 2

| VALVE POSITIONS FOR SAMPLING | V1 | V2 |
| --- | --- | --- |
| OUTDOOR AIR | 1-3 | 3-5 |
| RETURN AIR | 2-3 | 3-5 |
| SUPPLY AIR | — | 4-5 |

Those skilled in the art will appreciate that a particular valve position should be maintained for a sufficient time to permit previously sampled air to be purged from sensor 104 and to permit sensor 104 to reach equilibrium with respect to the currently sampled air. As each air sample (e.g., outdoor, return, and supply) is sequentially analyzed, sensor 104 generates an output signal 104A indicative of the $CO_2$ concentration level in the gas being sensed. Thus, during one portion of the sampling cycle, output signal 104A may correspond to the $CO_2$ concentration level in outdoor air; in another portion of a sampling cycle, output signal 104A may be indicative of the $CO_2$ concentration of return air, and so on. Controller 46 monitors output signal 104A and, in accordance with, inter alia, Equation (4), calculates the volume flow rate of fresh air into the system. As previously discussed, controller 46 may adjust one or more of exhaust air damper 30, recirculation damper 24, outside air damper 36, supply fan 18, and return fan 20 to achieve a desired fresh air volume flow rate (e.g., $CFM_{fa}$).

Those skilled in the art will also appreciate that the single sensor embodiment of FIG. 7 may suitably be configured to alternately sense only return air and supply air and to periodically sense outdoor air to compensate for long term changes in outdoor air $CO_2$ levels, as appropriate.

Figure 10:
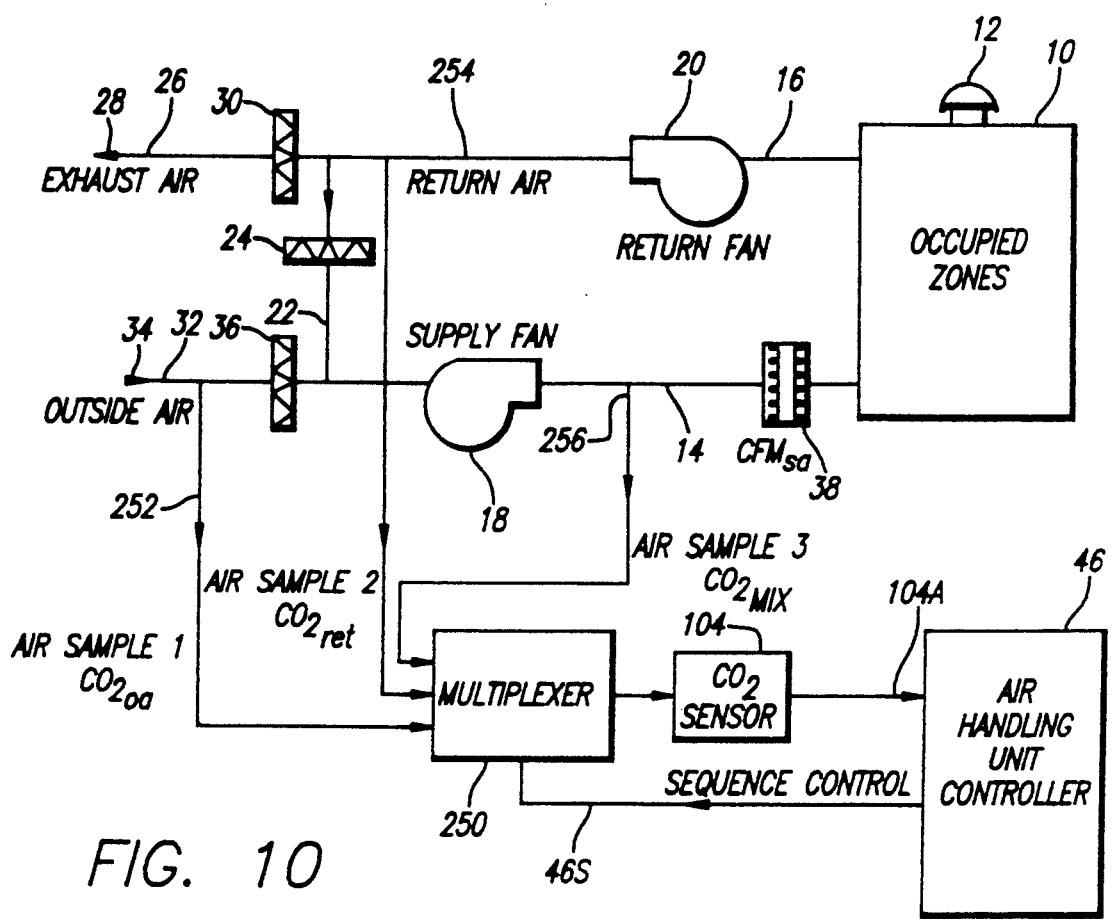
FIG. 10 is a schematic diagram illustrating a multiplexed single sensor embodiment of one aspect of the present invention.
Figure 11:
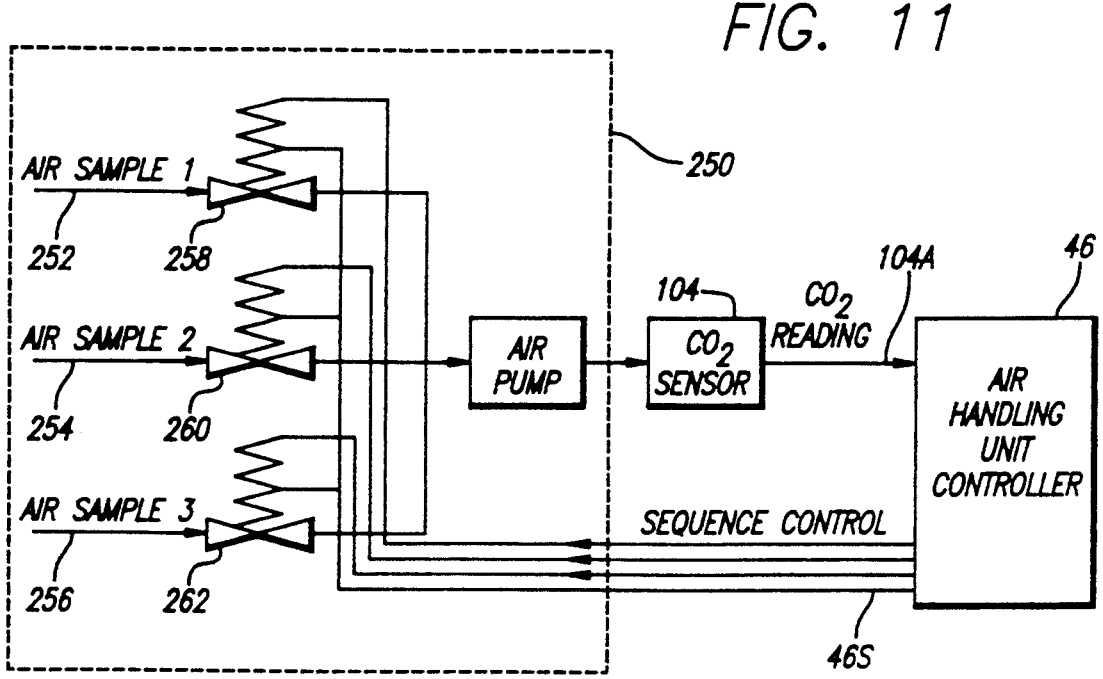
FIG. 11 is a detailed schematic diagram of an alternate preferred embodiment of the multiplexer shown in FIG. 10.

Referring now to FIGS. 10 and 11, an alternative embodiment of a single sensor implementation in accordance with the present invention comprises a first air sampling conduit 252, a second air sampling conduit 254, and a third air sampling conduit 256 configured to direct sampled air from various predetermined points within the air flow circuit to a multiplexer 250. Controller 46 applies respective sequence control signals 46S to multiplexer 250. In response to sequence control signals 46S, multiplexer 250 sequentially ports air from conduits 252, 254 and 256 to sensor 104, (e.g., a $CO_2$ sensor), whereupon sensor 104 applies signal 104A to controller 46. As discussed above, signal 104A corresponds to the trace gas concentration level in the air from first sample conduit 252 during one portion of a sampling cycle; signal 104A corresponds to the trace gas concentration level in the air from sample conduits 254 and 266, respectively, during other portions of a sampling cycle. Although the embodiment shown in FIG. 10 illustratively comprises three sample conduits, those skilled in the art will appreciate that the system may be configured for two, three or any desired number of sample conduits.

Referring now to FIG. 11, multiplexer 250 suitably comprises respective solenoid valves 258, 260 and 262. In the embodiment shown in FIG. 11, controller 46 is suitably configured to apply sequence control signals 46S to solenoids 258, 260 and 262 in a manner which sequentially ports various air samples to sensor 104 for analysis. More particularly and with momentary reference to FIG. 12, controller 46 may be configured to actuate solenoid 258 such that air from first sample conduit 252 flows through sensor 104 while solenoid 260 and 262 prevent air from respective sample conduits 254 and 256 from flowing through their associated solenoid valves. After a predetermined purge time $P_t$, controller 46 reads the value of signal 104A corresponding to the concentration level of the air sample currently passing through sensor 104. As previously discussed, the duration of purge time $P_t$ should be sufficient to permit output signal 104A to settle out.

More particularly, typical $CO_2$ sensors exhibit a response time of approximately 30 seconds. Proper selection of an air pump or fan will permit the sampling conduits to be fully purged in a relatively short amount of time, for example, on the order of 10 seconds to one minute. Thus, controller 46 may advantageously be configured to sequentially open respective solenoids 258, 260 and 262 for approximately one minute each. During the last five (5) or ten (10) seconds of each minute, controller 46 reads signal 104A for each sampled conduit. Thus, a complete sensing cycle for three sensing locations preferably lasts approximately three minutes.

As previously discussed, the single sensor embodiments of the present invention may be configured to sample two, three, or more air samples from different locations within HVAC System 400. To the extent Equation (4) is utilized in computing the fresh air flow volume rate, it is not necessary to accurately measure the absolute value of trace gas concentration in each sample in order to accurately determine fresh air volume flow rate. Nonetheless, it may be desirable in many applications to periodically calibrate the sensor to enhance its ability to accurately measure the absolute value of a particular gas sample. This is true for single sensor as well as plural sensor embodiments in the context of the present invention.

More particularly, multiplexer 250 (FIGS. 10-11) may be configured with a plurality of air sampling channels (conduits), one of which may be advantageously connected to a source of gas (e.g., air) with a predetermined content (e.g., 0 ppm) of a trace gas, for example, $CO_2$. Another sampling channel may be connected to a source of gas with another known $CO_2$ concentration (e.g., calibration air tank with 1,000 ppm of $CO_2$ concentration). The $CO_2$ concentration ratings obtained from these two calibration channels may then be used to periodically calibrate sensor 104, as desired. Moreover, a single calibration tank having a known (e.g., 0) concentration of the trace gas may be used as a hybrid auto-zeroing technique in a single sensor embodiment.

Sensor multiplexing offers better accuracy since it negates the effect of bias, sensitivity, linearity, and random-shift sensor errors. It also reduces the hardware components to a single sensor and single air pump. Auto-zeroing can be used to increase the absolute sensor accuracy since it allows for the sensor or sensors used in the context of the present invention to be calibrated against a known reference, for example the $CO_2$ concentration of fresh air. The auto-zeroing is performed under the direction of controller 46 on an adjustable periodic basis to provide fresh outdoor air to the sensor. During auto-zeroing, the signal of the $CO_2$ sensor is biased by a fixed amount to provide an output which is equal to the $CO_2$ concentration of the known fresh outdoor air reference.

It will be understood that the foregoing description is of preferred exemplary embodiments of the present invention, and that the invention is not limited to the specific forms described herein. For example, while the control circuitry is depicted in a hardware implementation, those skilled in the art will appreciate that any suitable analog or digital control system, including but not limited to a microprocessor, may be configured to implement the present invention. Furthermore, while the trace gas sampling techniques have been described in the context of an HVAC system, its applicability is not so limited. These and other substitutions, modifications, changes and omissions may be made in the design and arrangement of the elements without departing from the scope of the invention as expressed in the appended claims.

We claim:

1. An apparatus for determining the flow rate of supply fluid being utilized to circulate a mixed fluid of said supply fluid and a return fluid within a volume, said apparatus comprising:
   sensor means for sensing a component of said supply fluid, a component of said return fluid, and a component of said mixed fluid; and for providing a first output indicative of said supply fluid component, a second output indicative of said return fluid component, and for providing a third output indicative of said mixed fluid component;
   a circulation device configured to introduce said mixed fluid into said volume; and
   means for determining the flow rate of said supply fluid being utilized from the ratio of the difference between said second output and said third output to the difference between said second output and said first output.

2. An apparatus for determining the flow rate of outside air introduced into an HVAC system for circulating in a structure supply air, the apparatus comprising:
   a supply air duct coupled to said structure to introduce the supply air comprising said outside air and a portion of return air into said structure;
   a return air duct coupled to said structure to remove said return air from said structure;
   at least one outside air sensor operatively coupled to said supply air duct and said return air duct for measuring a component of the outside air and producing an outside air signal indicative of said component, for measuring a component of said return air and producing a return air signal indicative of said component, and for measuring said component of supply air and producing a supply air signal indicative of said component;
   means for effecting circulation of said supply air in said structure;
   means coupled to said supply means for determining a ventilation air flow rate; and
   control means for determining said flow rate of outside air from the product of said ventilation air flow rate and the ratio of the difference between said return air sensor means output and said supply air sensor means output to the difference between said return air sensor means output and said outside air sensor means output.

3. An apparatus as defined in claim 2 wherein said component comprises carbon dioxide.

4. A method for determining the flow rate of outside air introduced into a structure wherein supply air comprising outside air and return air is circulated in the structure, the method comprising the steps of:
   removing return air from said structure;
   recirculating at least a portion of said return air;
   measuring a concentration of a component in said return air and producing a return air component concentration;
   measuring a concentration of said component in said outside air and producing an outside air component concentration;
   measuring a concentration of said component in said supply air and producing a supply air component concentration;
   determining said flow rate of outside air from the ratio of the difference between said return air component concentration and said supply air component concentration to the difference between said return air component concentration and said outside air component concentration.

5. A method as defined in claim 4 including the further steps of measuring the rate of flow of said supply air into said system and producing a supply air flow rate and determining said flow rate of said outside air from the product of said supply air flow rate and said ratio.

6. A method as defined in claim 4 wherein said component is carbon dioxide.

7. A method for use in an apparatus for controlling the amount of outside air introduced into a system for circulating ventilation air in a structure, said apparatus comprising intake control means, recirculation control means, outside air sensor means, return air sensor means and supply air sensor means, said method for calibrating said supply air sensor means and said return air sensor means and comprising the steps of:

opening said intake control means;
closing said recirculation control means;
calibrating said supply air sensor means to said outside air sensor means;
closing said intake control means;
opening said recirculation control means; and
calibrating said return air sensor means to said supply air sensor means.

* * * * *